United States Patent [19]
Nergaard et al.

[11] Patent Number: 4,939,482
[45] Date of Patent: Jul. 3, 1990

[54] REMOTE OPTICAL SENSING DEVICE AND METHOD

[75] Inventors: David K. Nergaard, Littleton; Richard Scarlet, Boxborough; Seymour Goldberg, Saugus, all of Mass.

[73] Assignee: EG&G, Inc., Wellesley, Mass.

[21] Appl. No.: 66,210

[22] Filed: Jun. 24, 1987

[51] Int. Cl.$^5$ .............................................. H04B 9/00
[52] U.S. Cl. ................... 455/613; 455/618; 332/183
[58] Field of Search ............... 332/1, 7.51; 455/618, 455/605, 613; 250/551

[56] References Cited
U.S. PATENT DOCUMENTS
4,307,469  12/1981  Casper et al. ................. 455/618 X OTHER PUBLICATIONS
Goff, Bidirectional Communication Using a Single Gallium Arsenide Diode, Proceedings of the 27th Midwest Symposium on Circuits and Systems (1984), pp. 800–802.
Fasching et al., NTIS Publication DE85 017761.

Primary Examiner—Robert J. Pascal
Attorney, Agent, or Firm—Finnegan, Henderson, Farabow, Garrett & Dunner

[57] ABSTRACT

A remote sensing system including a control module coupled to a remote device module via an optical fiber is disclosed. The device module includes circuitry for detecting changes in physical parameters and for transmitting data relating thereto back to the control module in serial form via the optical fiber. Power for the circuitry within the device module is obtained from a photodiode which receives light from the control module via the optical fiber and no power multiplication is utilized except which the remote module is transmitting serial data back to the control module. Data signals are also provided from which monitoring of the integrity of the device module and connections thereto can be obtained.

10 Claims, 9 Drawing Sheets

REMOTE OPTICAL SENSING DEVICE AND METHOD

BACKGROUND OF THE INVENTION

1. Field of the Invention

The present invention relates to remote sensing devices and, more particularly, to a device and method for remote sensing involving the use of a control module and a remote device module optically coupled thereto whereupon changes in physical parameters detected by the device module are transmitted as data signals back to the control module. In one embodiment, the invention concerns a device and method for remote sensing by multiplexing information from a plurality of binary optical sensors that detect the operating states of corresponding switches and controls.

2. Description of the Prior Art

Remote sensing of the operating status of switches has broad utility, particularly in the manufacturing arts. In such applications, switches indicative of the operation or parameters of the various production equipment need to be monitored to insure accuracy and speed of operation. Any malfunction of the manufacturing of equipment can be monitored by such remote sensing techniques so that an alarm signal can be generated to insure that remedial action is taken quickly. Such sensing is also useful in automated manufacturing operations, e.g., to control parameters of the line equipment, insure that operating instructions are carried out, adjust speed or other factors in response to detected situations, etc. In these applications, the remote sensing equipment is typically coupled to a computer or microprocessor controller so that responsive action can be taken automatically according to the detected line operation.

Devices for performing remote sensing are known and typically comprise a control box that is located remote from the monitored switches. Information concerning the status of these switches is conveyed to the control box via appropriate means. For example, switches incorporating optical sensors are known wherein operation of the switch selectively blocks and unblocks light that is carried via an optical fiber. In such sensing arrangements, the switch typically transmits at least 3-4 times more light in one position than in another, e.g., 10-12% light transmission when "ON" and 3-4% transmission when "OFF." Conventional systems may therefore employ a plurality of fiber optic cables coupling the switches to a remote control module so that the operational status of each switch can be monitored. Devices for multiplexing such numerous signals are well known, but require connection to local electrical power sources rather than using a power supply derived from an optical fiber.

An improvement in this arrangement is known in which the number of optical fibers coupled to the control module is reduced by employing other modules—called "device modules"—that are located relatively close to the monitored switches. The device modules are each connected via a splitter to a single optic fiber that is ultimately coupled to the remote control module. Such a device is illustrated in a publication authored by Fasching et al. and which is available from the NTIS under Publication No. DE85 017761.

In the Fasching et al. device, the central optical fiber is provided with photodiodes at each end thereof. Light generated by the control module is transmitted via the optical fiber to the device modules where it is converted via a photodiode and voltage multiplier to an 8 to 15 volt level. This voltage is used by circuitry in the device module to determine the state of an analog sensor via a resistive bridge, as well as to power the circuitry contained in the device module for obtaining this information. The obtained information is then converted via the same photodiode into a light signal that is transmitted back to the control module on the optical fiber.

A drawback of the Fasching et al. device is the need for providing a separate device module for each sensor that is to be monitored. This raises the cost and burden of installing such a system when a plurality of sensors are involved. A further drawback is the need for relatively high intensity light being generated and transmitted on the common optical fiber due to the use of relatively high (8–15 volts) levels in the device modules. This is further complicated by the large number of device modules needed to accommodate numerous sensors. A further drawback of the Fasching et al. device relates to the lack of information transmitted from the device modules to the control module regarding status of the interconnecting fiber optic cable, e.g., whether a break has occurred permitting introduction of ambient light.

Accordingly, a need exists for a remote sensing device capable of determining the operating status of numerous binary optical sensors without the drawbacks outlined above.

More broadly stated, a need generally exists for a remote sensing device utilizing optical coupling between the control end and the remote device end wherein power for any circuitry contained in the remote device end is provided via the optical coupling. Although Fasching et al. shows delivery of power in such a manner, the prior art device suffers in requiring immediate multiplication of the power in order to operate circuit elements within the remote modules. This arrangement suffers in that it requires high power consumption, and hence relatively high light transmission, to ensure operation of the circuits within the remote modules. A need thus exists for a remote optical sensing arrangement whereby lower power consumption, i.e., operation without the use of power multipliers, is present.

A further need exists with respect to monitoring of the optical sensing system, particularly with respect to operation of the remote module circuitry as well as integrity of the optical interconnection. Through such monitoring, accurate and reliable operation of the remote sensing system can be assured. In comparison, the lack of such monitoring raises doubts as to whether data being received by the control module is accurate as to the status of the physical parameter(s) being sensed or whether it is in fact indicative of a fault occuring within the system.

Another source of failure in prior art optical sensing systems is the introduction of ambient light into the binary optical sensors and/or their respective optical connections. Such ambient light will typically cause false data to be generated by the remote module, thus leading to errors in data interpretation carried out by the control module. One prior art approach to avoiding errors due to ambient light involves modulating the signal light at a known frequency, e.g., a few kilohertz, and then examining the modulated content of the return light. Such known arrangements cannot be employed in low power systems, however. A need therefore exists for a means to identify and reject such false ambient light signals in remote sensing devices.

SUMMARY OF THE INVENTION

It is therefore an object of the present invention to provide a device for remote sensing of physical parameters through use of a control module optically coupled to a remote device module.

It is a further object of the invention to provide power to the remote device module via the optical coupling whereby circuitry within the device module functions at very low power and voltage, e.g., from the voltage of a single photocell.

Another object of the invention is to perform the data transmission back to the control module at very low power and voltage.

Other objects of the invention include monitoring of the overall remote sensing system, including monitoring the performance of circuitry within the remote device module and monitoring the performance of the optical coupling between the device module and the control module.

The present invention also provides for the identification and rejection of false data signals resulting from the introduction of ambient light into the optical sensors from which the device module converts the data signals.

It is another object of the present invention to provide a device for remote sensing of binary optical sensors in which a single device module can be used with a plurality of sensors.

It is a further object of the present invention to accomplish such remote sensing without any electrical power connection between the control and device modules or any need for stored power, e.g., a battery, in the device module.

Another object of the present invention is to provide for comparing the intensity of light signals without involving the consumption of power.

Additional objects and advantages of the invention will be set forth in part in the description which follows, and in part will be obvious from the description or may be learned by practice of the invention. The objects and advantages of the invention will be realized and attained by means of the instrumentalities and combinations particularly pointed out in the appended claims.

To achieve the objects and in accordance with the purpose of the invention, as embodied and broadly described herein, the invention includes a device for connection to a plurality of binary optical sensors for remotely sensing the operating status of the sensors, comprising: means for generating a first light signal; means for splitting the first light signal into a first portion, a second portion and a plurality of third portions; supply means for converting the first portion of the first light signal into a power supply voltage; optical switch sensing means for coupling each of the plurality of third portions of the first light signal individually to respective ones of the plurality of optical sensors and for providing a plurality of return light signals, each of the return light signals having an intensity indicative of the operating status of the respective ones of the plurality of optical sensors; data detection means coupled to the optical switch sensing means for converting each of the plurality of return light signals into a corresponding plurality of data signals, the data detection means further being coupled to the splitting means for converting the second portion of the first light signal into a reference signal; control means coupled to the data detection means for converting the plurality of data signals into an output signal containing information corresponding to the values of the data signals in response to the reference signal reaching a predetermined value; transmitting means for converting the output signal into a second light signal; and receiving means for converting the second light signal into data corresponding to the operating status of the sensors; the data detection means, the control means and the transmitting means being coupled to the supply means for receiving the power supply voltage.

In other aspects, the present invention relates to a device adapted for connection to a plurality of binary optical sensors for remotely sensing the operating status of the sensors, comprising: means for generating a first light signal; means for splitting the first light signal into a first portion and a plurality of other portions; supply means for converting the first portion of the first light signal into a power supply voltage; optical switch sensing means for coupling each of the plurality of other portions of the first light signal individually to respective ones of the plurality of optical sensors and for providing a plurality of return light signals, each of the return light signals having an intensity indicative of the operating status of the respective ones of the plurality of optical sensors; data detection means coupled to the optical switch sensing means for converting each of the plurality of return light signals into a corresponding plurality of data signals; control means coupled to the data detection means for converting the plurality of data signals into an output signal containing information corresponding to the values of the data signals; transmitting means for converting the output signal into a second light signal; and receiving means for converting the second light signal into data corresponding to the operating status of the sensors; the data detection means, the control means and the transmitting means being coupled to the supply means for receiving the power supply voltage.

The present invention further relates to a method for detecting failure in an optical path coupled to a binary optical sensor for carrying light of a predetermined wavelength, comprising the steps of: directing light carried in the optical path from the sensor through a first filter which only passes light at the predetermined wavelength; converting the filtered light output by the first filter into a data signal; directing light carried in the optical path from the sensor through a second filter which only passes light at wavelengths other than the predetermined wavelength; converting the filtered light output by the second filter into an ambient light signal; and comparing the amplitudes of the data signal and the ambient light signal to determine failure of the optical path.

Another aspect of the present invention is a light ratio detector for comparing intensity of light from a data light source with light from a reference light source, the detector being coupled to a D.C. voltage reference, comprising: a first photodiode receiving the light from the data light source; and a second photodiode receiving the light from the reference light source, the first and second photodiodes being operated photovoltaically and coupled in series across the D.C. voltage reference, with a junction point between the first and second photodiodes delivering an output voltage that is greater than or less than one-half of the D.C. voltage reference according to whether the light from the data source has an intensity greater or less than the light from the reference source.

The present invention also relates to a low-power device for converting a voltage signal into optical data, comprising: a light emitting diode having a predetermined forward current conduction threshold; power supply means coupled to the diode for maintaining a voltage bias across the diode at a level below the forward current conduction threshold; and flyback circuit means receiving the voltage signal and being coupled to the diode and to the power supply means for delivering voltage pulses to the diode in accordance with the voltage signal, the voltage pulses having a level greater than the forward conduction threshold for causing the biased diode to emit optical data corresponding to the voltage signal.

According to another aspect of the present invention, a remote sensing device is provided, comprising: a control module including means for transmitting a first light, means for receiving a second light for detecting digital optical data in the second light, means for determining data content of the second light received by the second light detecting means, and means for providing an electrical output representing the received signals; a device module including first light detecting means, including a photodetector, for providing a supply voltage at the voltage of the photodetector, circuit means functioning at the supply voltage for outputting data signals responsive to changes in physical conditions sensed by the device module, data transmitting means functioning at the supply voltage for converting the data signals into output pulses at a voltage greater than the supply voltage, and means driven by the output pulses from the data transmitting means for transmitting the second light; and optical means for connecting the first light transmitting means with the first light detecting means and the second light transmitting means with the second light detecting means.

The accompanying drawings, which are incorporated in and constitute part of this specification, illustrate an embodiment of the invention and, together with the description, serve to explain the principles of the invention.

DESCRIPTION OF THE PREFERRED EMBODIMENT

Figure 1:
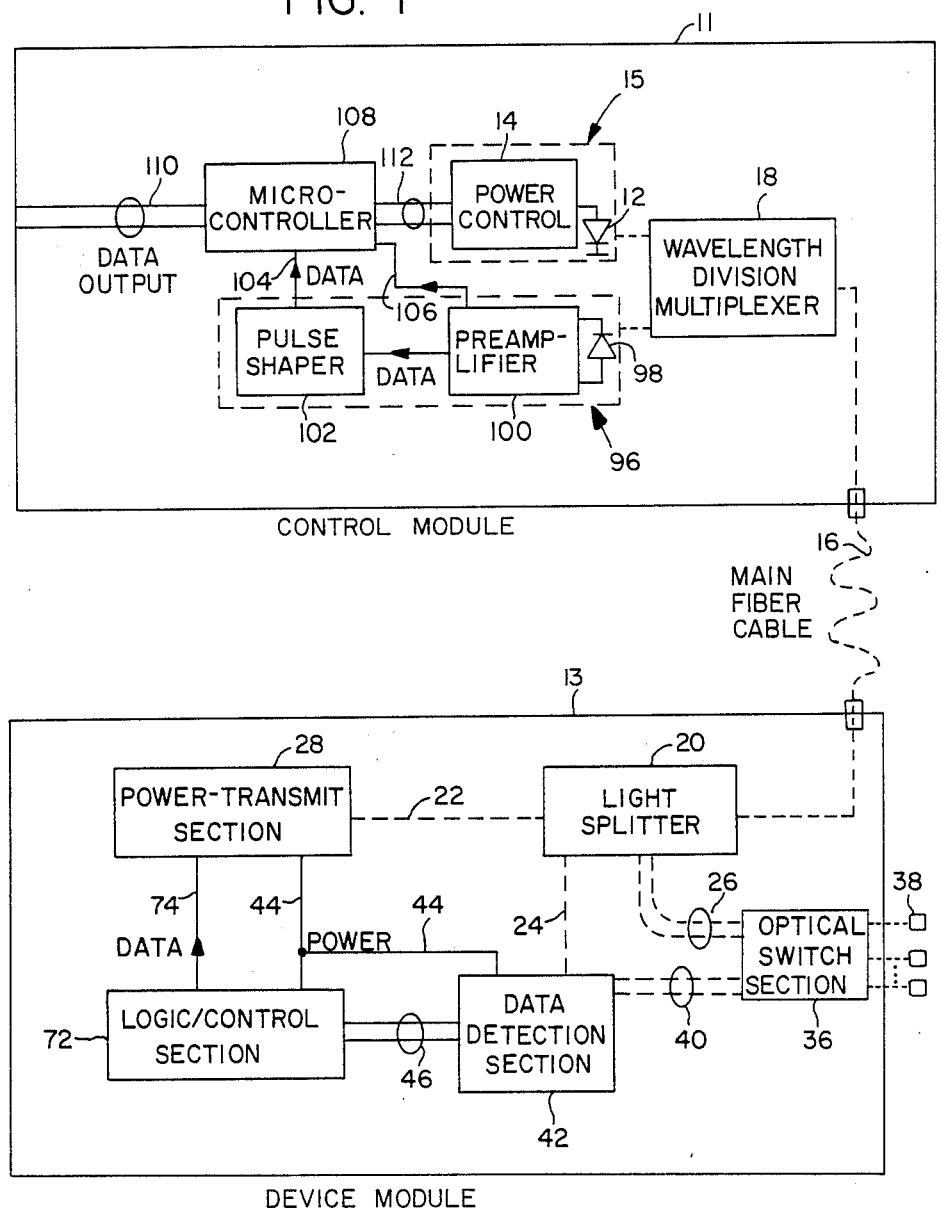
FIG. 1 is a schematic block diagram of a remote optical sensing device according to the present invention.

Reference will now be made in detail to the presently preferred embodiments of the invention, examples of which are illustrated in the accompanying drawings. Throughout the drawings, like reference characters are used to indicate like elements.

FIG. 1 is a block diagram of a system, generally designated by reference character 10, adapted for connection to a plurality of binary optical sensors for remotely sensing the operating status of the sensors in accordance with the present invention. As embodied herein, the device is comprised of a control module 11 and a device module 13 connected by a main optical fiber cable 16.

According to the invention, means are provided for generating a first light signal. As embodied herein, such means are indicated within the double line referred to at 15 and preferably comprise a conventional light emitting diode (LED) 12 driven by a power control means 14. These two elements are arranged such that LED 12 delivers a first light signal to a main fiber cable 16 via a wavelength division multiplexer 18. Devices suitable for elements 12, 14 and 18 are known in the art, whereby a light signal generated by LED 12 under control of power control 14 is applied via multiplexer 18 onto main fiber cable 16.

According to the invention, means are provided for splitting the first light signal into a first light portion, a second light portion and a plurality of individual third light portions. As embodied herein, the splitting means are indicated in FIG. 1 by reference character 20 which denotes a conventional light splitter. Splitter 20, which is coupled to main fiber cable 16, acts to divide the first light signal on fiber cable 16 into three components: a first portion carried on an optical fiber 22; a second portion carried on an optical fiber 24; and a plurality of third portions individually carried on a respective plurality of optical fibers 26. According to a preferred embodiment, the first light portion carried on fiber 22 comprises approximately 80% of the light carried by optical fiber 16, while the second and third portions carried on optical fibers 24 and 26 each comprise approximately 1-2% of the total light. Splitting means capable of achieving these functions are known in the art and need not be described in further detail for purposes of understanding the present invention. Additionally, splitting arrangements other than the percentages specified above can be employed without departing from the spirit or scope of the present invention. However, it is foreseen that the larger percentage of light should be used for providing power for the device module 13 via coupler 22.

Also according to the invention, supply means are provided for converting the first portion of the first light signal into a power supply voltage. As embodied herein, the supply means are contained within the block labeled "power-transmit section" identified by reference character 28 in FIG. 1. Further details of the supply means can be appreciated by reference to FIG. 4a. As shown in this figure, supply means 28 comprises a photodiode 30 coupled to receive the first portion of light from splitter 20 via optical coupler 22. Photodiode 30, upon receiving the first portion of light, develops a voltage in a well known manner which is available at terminal B+ via an inductor 32. In order to filter and momentarily store the supply voltage provided by diode 30, a plurality of capacitors 34 are provided between terminal B+ and a ground terminal GND. As described hereinbelow, light delivered via optical fiber 16 is directed through splitter 20 and optical fiber 22 onto photodiode 30 so as to develop a supply voltage available at terminal B+.

The invention further includes optical switch sensing means for coupling each of the plurality of third portions of the first light signal individually to respective ones of the plurality of the binary optical sensors and for providing a plurality of return light signals, each of the return light signals having an intensity indicative of the operating status of the respective ones of the plurality of optical sensors. As embodied herein, optical switch sensing means 36 is shown in block diagram form in FIG. 1 and in greater detail in FIG. 2a. Optical switch section 36 is coupled to light splitter 20 via optical coupler 26 which, as shown best in FIG. 2a, comprises a plurality of individual optic fibers labeled 26a, 26b, . . . 26n. Optical fibers 26a–n individually deliver respective third portions of the first light signal, each approximating 1% of the intensity of the first light signal, to a respective one of light sensors 38a, 38b, . . . 38n.

Optical sensors 38 are of a type known in the art which are capable of selectively altering the transmission of light therethrough so as to achieve a substantial difference in transmitted light between "ON" and "OFF" positions. The sensors 38 may comprise, for example, optical switches or other devices which alter transmission of light therethrough in response to a change in operating conditions, such as "wet" optical sensors that are responsive to the presence of a liquid. Such optical sensors are known in the art and need not be described further for purposes of understanding the present invention. It is to be appreciated that the present invention contemplates utilization of these various types of binary optical sensors in referring, at times, to the sensors as being "on" or "off", i.e., having an operating status indicated by the instant light transmitting behavior of the sensor.

Figure 2A:
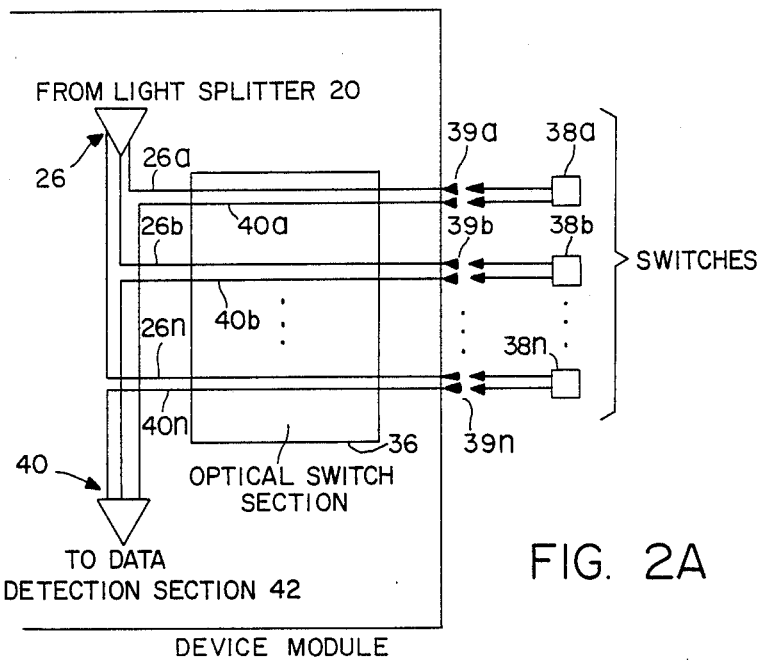
FIG. 2a is a schematic diagram illustrating the optical switch section of the remote sensing device of FIG. 1 in more detail and showing the use of external binary optical sensors.

To provide a return path for light selectively transmitted by optical sensors 38, i.e., the "return light signals", a plurality of optical fibers 40a, 40b, . . . 40n are provided; these optical fibers are generally indicated by reference character 40 in FIGS. 1 and 2a. Optical fibers 40 carry a plurality of return light signals, each of the return light signals having an intensity indicative of the operating status of a respective one of the plurality optical sensors 38. According to a preferred embodiment, optical sensors 38 can be disconnected from the device module via suitable connectors 39a, 39b, . . . 39n provided in optical fibers 40a, 40b, . . . 40n, respectively.

In accordance with the present invention, data detection means are provided coupled to the optical switch sensing means for converting each of the plurality of return light signals into a corresponding plurality of data signals, the data detection means further being coupled to the splitting means for converting the second portion of the first light signal into a reference signal. As embodied herein, the data detection means are indicated by reference character 42 in FIGS. 1 and 3. Referring first to FIG. 1, it is seen that data detection section 42 is coupled to light splitter 20 via optical coupler 24 so as to receive a percentage of the light transmitted via main fiber cables 16, e.g., 1% or substantially the maximum amount of return light as is carried on each of optical fibers 40a–n. Data detection section 42 is coupled to optical switch section 36 via optical fibers 40 so as to receive the return light signals indicative of the operating status of optical sensors 38. Data detection section 42 is further coupled to power-transmit section 28 via a conductive line labeled 44 so as receive electrical power for the components comprising data detection section 42. As explained in further detail hereinbelow, section 42 converts information carried on optical fibers 24 and 40 from light signals to electrical signals which are outputted on conductive lines 46.

Figures 1, 3:
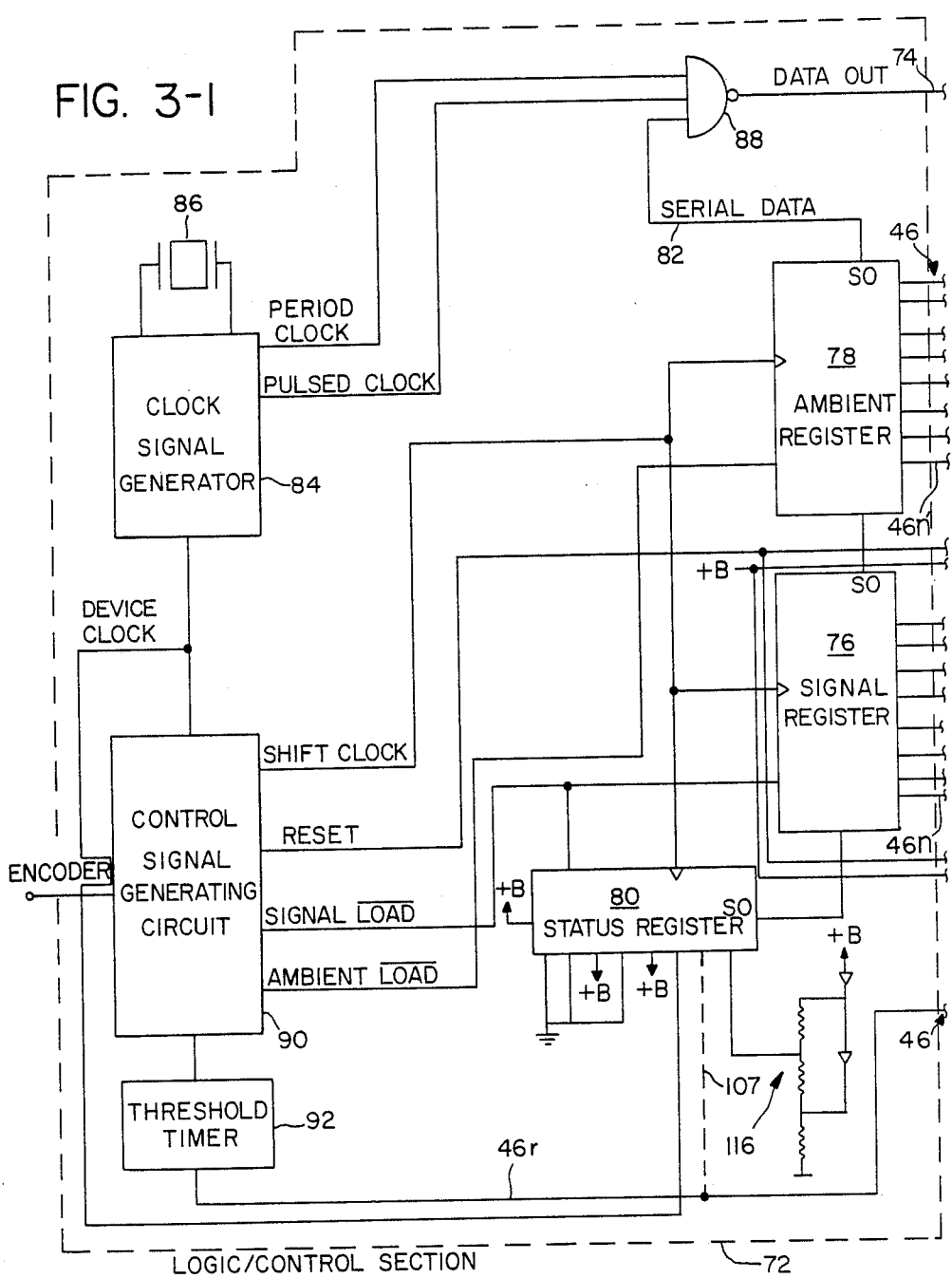
FIG. 3 is a schematic diagram illustrating in more detail the data detection and logic/control sections of the remote sensing system of FIG. 1.
Figures 2, 3:
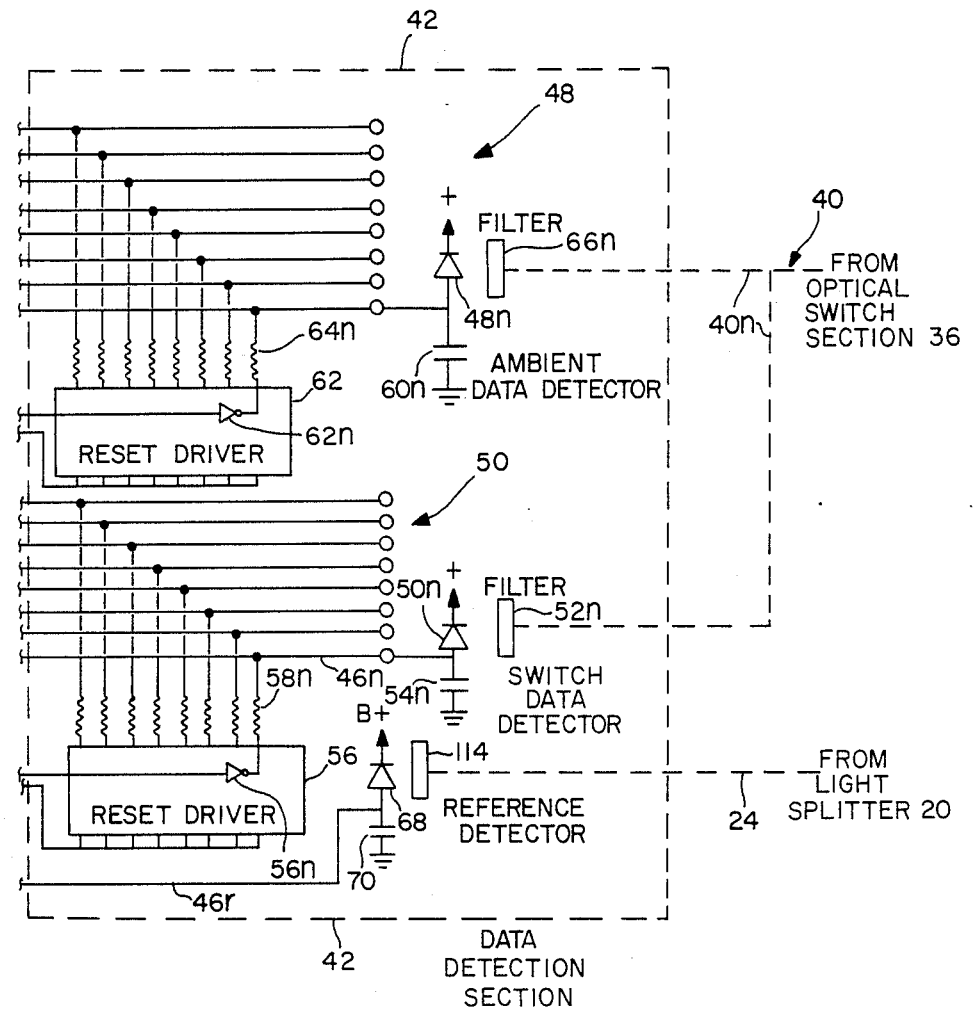

Further details concerning the preferred embodiment of data detection section 42 can be appreciated by reference to FIG. 3. In this drawing, the same reference characters are used to indicate the elements outlined above with respect to the block diagram of FIG. 1. In the detailed circuit diagram, data detection section 42 can be seen to include a plurality of photodiodes 48, 50 for converting the return light signals carried on optical fibers 40 from optical switch section 36 into corresponding electrical signals output on conductive lines 46. For illustrative purposes, only one photodiode 48n, 50n of each of the total plurality of photodiodes is shown herein; these photodiodes are arranged so as to receive the return light signals carried on optical fiber 40n corresponding to the operating status of sensor 38n. It is to be appreciated, however, that the following description of these photodiodes is applicable to a plurality of other photodiodes 48a, 48b, . . . and 50a, 50b, . . . which are not specifically depicted in FIG. 3 for sake of brevity.

Figure 4A:
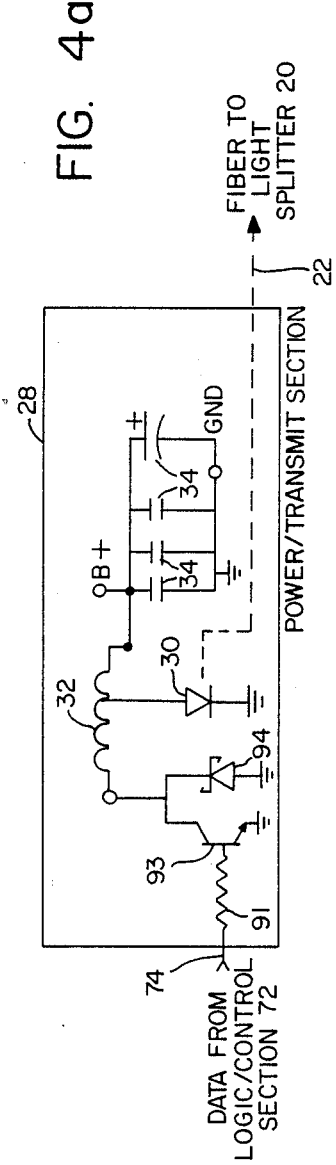
FIG. 4a is a schematic circuit diagram illustrating in more detail the power-transmit section of the optical sensing system of FIG. 1.

The return light signal carried on optical fiber 40n is conveyed to data detector photodiode 50n via an optical filter 52n. Filter 52n is a bandpass filter which passes light only at the tuned wavelength. For example, in a presently preferred embodiment, first light signals transmitted on main fiber cable 16 (FIG. 1) are at approximately 815 nm so that the return light signals carried on optical fiber 40n are at this same wavelength. Filter 52n passes light at this wavelength, but blocks light at other wavelengths. When light at 815 nm is presented to photodiode 50n, the photodiode outputs a signal on corresponding output line 46n. The output on conductive line 46n is shaped via integration due to a capacitor 54n coupled between output 46n and ground; the opposite end of photodiode 50n is coupled to the power supply voltage terminal B+ (FIG. 4a). The particular output on line 46n, which is only one of the plurality of data signals delivered by data detection section 42, is further controlled via a reset driver 56 which is coupled to the supply voltage terminal B+ and controlled via an input line carrying a "reset" signal as will be explained herein below. Reset driver 56 comprises a plurality of inverters, such as inverter 56n, whose input is coupled to receive the reset signal and whose output is coupled to conductive line 46n via a resistor 58n. In operation, the application of a reset signal causes grounding and discharge of capacitor 54n, whereafter the output of photodiode 50n is integrated and applied as one of the data signals output on lines 46 from data detection section 42.

Photodiode 48n is arranged in a manner similar to that of photodiode 50n and, hence, includes an integrating capacitor 60n coupled to a reset driver 62, including a plurality of inverters, such as inverter 62n having an input receiving the reset signal and an output delivered via resistor 64n. The output of photodiode 48n comprises another one of the data signals delivered by data detection section 42 and is outputted on a conductive line 46n'. Although photodiode 48n is provided with a filter 66n in an arrangement structurally similar to that of filter 52n with respect to optical fiber 40n, filter 66n differs in being a bandreject filter. That is, filter 66n passes light at all wavelengths other than the intended wavelength, i.e. 815 nm in the foregoing example.

In a preferred embodiment, photodiodes 48n and 50n can be disposed adjacent one another so as to simultaneously receive light from optical coupler 40n. Filters 52n and 66n would thus be disposed immediately over respective photodiodes 50n and 48n. Bandpass and bandreject filters suitable for such purposes are well-known in the art and need not be described further for purposes of understanding the present invention.

As will be explained in detail hereinbelow, photodiode 50n and associated circuitry is used to develop information concerning the operating status of sensor 38n (FIG. 2a). Photodiode 48n is used to develop information concerning the presence of ambient light in the optical coupling connected to sensor 38n. The latter photodiode may not be essential to detection of operating status on a primary level, and could be connected instead to a different optical sensor altogether so as to increase the capacity of the multiplexing arrangement. However, the ability to detect ambient light indicative of proper operation of the optical coupling to sensor 38 is a desirable feature, as explained below.

Data detection section 42 further includes a reference detector photodiode 68 arranged to receive the light on optical fiber 24 from light splitter 20. The purpose of the reference signal is to control the time at which the data on lines 46 is sampled, including preventing such sampling from occurring should insufficient light be present. Photodiode 68 also works in an integrating arrangement and, thus, is provided at one end with a capacitor 70 and at the other end is coupled to supply voltage from terminal B+. The second portion of the first light signal delivered via optical fiber 24 is converted by photodiode 68 into a reference signal that is delivered from data section 42 on a conductive line 46r.

According to the invention, control means are provided coupled to the data detection means for converting the plurality of data signals into an output signal containing information corresponding to the values of the data signals in response to the reference signal reaching a predetermined value. As embodied herein, the control means are illustrated by the block labeled "logic/control section" indicated by reference character 72 in FIG. 1 or FIG. 3. Section 72 receives power via conductive line 44 coupled to terminal B+ of power-transmit section 28 and, further, receives the plurality of data signals and the reference signal from data detection section 42 via conductive lines 46. Section 72 delivers an output signal labeled "data" on conductive line 74 illustrated in the block diagram.

Further details concerning logic/control section 72 can be learned from the circuit diagram of FIG. 3. In a preferred embodiment, section 72 includes several parallel-to-serial registers 76, 78 and 80 which serve to convert the plurality of data signals received from data detection section 42 on conductive lines 46 into a stream of serial data output on line 82. Thus, the serial outputs of registers 80, 76 and 78 are respectively connected so that the data signals input in parallel to each register can ultimately be clocked out as serial data on line 82. In this manner, information concerning the operating status of each optical sensor 38 is placed on line 82 as serial data after being converted from light signals to electrical signals via data detection section 42.

Other circuitry within logic/control section 72 is responsible for generating the various control signals used to achieve the afore described movement of data. A clock signal generator is coupled to a source of excitation signals, such as a crystal oscillator 86. In known fashion, clock signal generator 84 generates a plurality of clock signals having different frequencies, labeled "period clock", "pulsed clock", and "device clock" in FIG. 3. These clocks control the ultimate outputting of the data presented on lines 46. In a preferred embodiment, the device clock may range from 32 Hz to 128 Hz, with the period clock being at a slower frequency and the pulsed clock being at a considerably higher frequency; however, other frequencies of operation can be used without departing from the spirit or scope of this invention.

A NAND gate 88 is provided having inputs receiving the serial data on line 82 as well as the period clock and pulsed clock delivered from clock signal generator 84. The output of gate 88 is coupled to power-transmit section 28 via conductive line 74.

Logic/control section 72 further includes a control signal generating circuit 90 and a threshold timer 92. Control signal generating circuit 90 responds to the output of threshold timer 92 which is driven by the reference signal delivered from reference photodiode 68. Control signal generating circuit 90 produces numerous control signals which control the operation of registers 76, 78 and 80, as well as the resetting of drivers 56 and 62, in response to the reference signal reaching a value sufficiently high as to trigger an output from threshold timer 92. These control signals are labeled in FIG. 3 as a shift clock, a reset, a signal load and an ambient load. The particular manner in which each of these control signals is generated and the interrelationship and function provided therefrom will be explained in detail hereinbelow. Essentially, the presence of a reference signal on conductive line 46r within a predetermined time period and having a sufficiently high value causes threshold timer 92 to develop a signal which first triggers a signal load output. Subsequently, the "ambient load" output is triggered and the "shift clock" begins a pulsing operation. Finally, a "reset" output is triggered to start another data cycle. Collectively, these signals cause the inputting and subsequent conversion of data signals on conductive lines 46 through NAND gate 88 and out data output 74 in serial form.

In accordance with the present invention, transmitting means are provided for converting the output signal into a second light signal. Referring first to FIG. 1, the transmitting means are preferably included within power-transmit section 28 and receive the serial output signal indicative of the status of the sensors 38 provided on data line 74. The transmitting means cause the output signal on data line 74 to be converted into a second light signal which is carried via optical fiber 22 through light splitter 20 back onto main fiber cable 16.

Details of the transmitting means can be appreciated by reference to FIG. 4a. In this drawing, data from logic/control section 72 is provided on output line 74 through a resistor 91 to the base of a transistor 93. The emitter of transistor 93 is coupled to ground and the collector of transistor 93 is coupled to one end of inductor 32 and to the cathode of a Zener diode 94. The anode of diode 94 is coupled to ground. Photodiode 30, discussed previously, is coupled to inductor 32 via a tap and the opposite end of inductor 32 is coupled to power supply voltage terminal B+. When data in the form of an output signal is presented on line 74, the disclosed circuit causes relatively high voltage pulses to appear across photodiode 30 which thereby acts as a light emitting diode (LED). The data pulses are thus converted into a second light signal which is transmitted via optical fiber 22 through light splitter 20 to fiber cable 16.

In accordance with the invention, receiving means are provided for converting the second light signal into data corresponding to the operating status of the sensors. As embodied herein, the receiving means are illustrated in block diagram form in FIG. 1 and generally designated by reference character 96. Receiving means 96 receive the second light signal from main fiber cable 16 via wavelength division multiplexer 18. The second light signal excites a photodiode 98 whose output is amplified by a preamplifier 100. Information derived from the third light signal by preamplifier 100 is output as data to a pulse shaper 102 which squares off the received data into regularly-shaped pulses available on output 104. Output 104 is delivered to a microcontroller 108 which, on the one hand, outputs data to the outside world via connecting lines 110 and, on the other hand, outputs control information to power control circuit 14 via conductive lines 112. Via microcontroller 108, appropriate adjustments in light intensity generated by power control 14 can be made, as described herein below.

As shown best in FIG. 1, the various elements comprising the inventive remote sensing device are divided between a "control module" and a "device module." The latter is coupled to the former via main fiber cable 16 and can be located a considerable distance away. Thus, the device module can be disposed relatively close to the sensors being monitored while control module can be located in a convenient place, such as in a control room.

Figure 7:
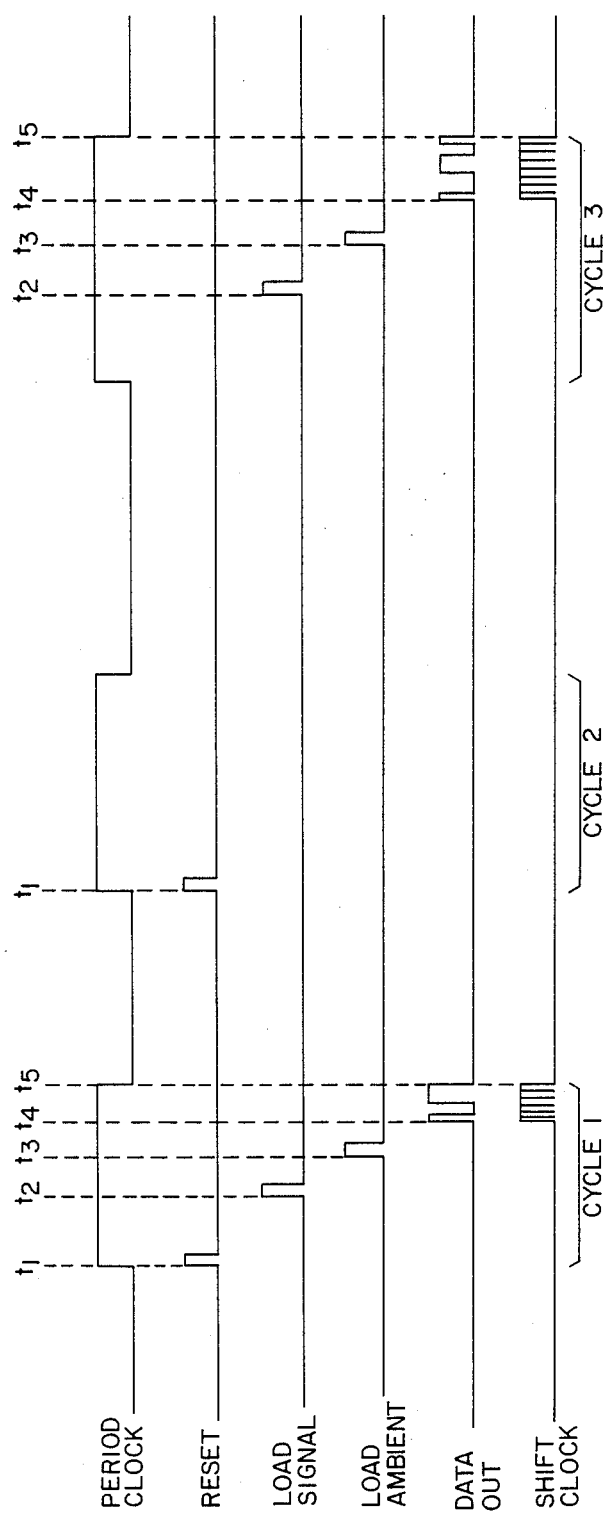
FIG. 7 is a timing diagram of the remote sensing device of FIGS. 1 and 3.

Operation of the basic device according to the present invention will now be described with reference to the aforementioned drawings, as well as to the timing diagram as shown in FIG. 7.

By way of overview, operation of the remote sensing device according to the present invention involves transmitting a first light from generating means 10 through main fiber cable 16 to light splitter 20. This first light is divided into a first portion delivered to power-transmit section 28 so as to develop a supply voltage. The first light signal is further split into a plurality of third portions delivered to the corresponding plurality of optical sensors 38 via optical switch section 36. Depending upon the status of sensors 38, a respective plurality of return light signals are outputted by optical switch section 36, each of these return light signals having an intensity indicative of the operating status of the respective one of sensors 38.

The return light signals are delivered in parallel to data detection section 42 along with the second portion of light from the first light signal divided by light splitter 20. Within data detection section 42, all of these light signals are converted to corresponding voltage levels. The signals from optical switch section 36 are delivered in parallel as a plurality of data signals, whereas the signal from light splitter 20 provided on optical fiber 24 is delivered as a reference signal. All of these signals are carried on output lines 46, with data detection section 42 being powered by power-transmit section 28 via supply line 44.

In response to the reference signal, logic/control section 72 converts the plurality of data signals from parallel to serial form. The converted serial data, along with certain other information signals described below, are delivered to power-transmit section 28 via data output 74. Like the other sections in the device module, logic/control section 72 receives power from power-transmit section 28 via supply line 44.

Within the power-transmit section 28, the serial data output is converted into a second light signal which is carried via optical fiber 22 through light splitter 20 on to main fiber cable 16 The second light signal is provided to the control module at a different wavelength than the first light signal provided from the control module.

Within the control module, receiving means 96 detect the presence of the second light signal and convert the information contained therein back to electronic data for use by microcontroller 108. Such use can include outputting information via data output 110 so as to provide a read out of the status of switches 38. The converted information may also be used by microcontroller 108 to effect adjustments in the first light generating means 10, e.g., to increase or decrease the intensity of light being sent to the device module.

Specific details concerning the operation of the remote sensing device according to the present invention will now be explained with reference to FIGS. 1, 2a, 3, 4a and 7.

According to a preferred embodiment, power to drive the circuitry contained in the device module is derived from the first light signal transmitted on main fiber cable 16. This first light signal, which has an optical wavelength of 815 nm, by way of example only, is received by power/transmit section 28 (FIG. 4a). Photodiode 30 converts the received portion of the first light signal into a supply voltage, such as 0.7 to 0.9 volts. The power thus generated is the source of the B+ power for the rest of the device module. Capacitors 34 provide filtering of this power during the fluctuating power demands of the device module.

It is noted here that, unlike prior art systems, the sensing device according to the present invention operates chiefly at this low voltage, with power supply voltage multiplication only being used for transmitting data back to the control module. In comparison, prior art devices incorporate power multiplication at the outset in order to operate all of the remote electronic circuitry. Such an approach involves higher power consumption, and hence, greater light intensity transmitted from the control module. The approach taken according to the present invention avoids these drawbacks. To capitalize on the lower voltage and power involved in a device according to the present invention, integrated circuits of the advanced CMOS type are used, for example, those known in the art as the 74HC and 74AC types. In the inventive system, these are operated at relatively low logic frequencies, such as less than 30 kHz. However, the low voltage of operation may give rise to race problems which must be resolved in the same manner as if a high frequency operation at conventional voltages was employed.

The supply voltage available on terminal B+ is below the normal forward current conduction threshold of diode 30, according to the present invention. Thus, the supply voltage is below the voltage knee of the operating curve of diode 30 until such time as transmission of a light pulse (the "second light signal") is to occur. Only at that time is a higher voltage applied so as to forward bias diode 30, thereby causing it to operate as a light emitting diode. Particulars of this transmission arrangement are detailed further below.

An advantage associated with this low voltage supply condition is reduced power consumption in the device module, as compared with higher supply voltage applications, due to the fact that the supply voltage is normally below the threshold voltage needed to turn on the two series-connected complementary gate transistors typically used in CMOS integrated circuits. When the CMOS circuits switch from one logic level to another, there is therefore virtually no time during which both transistors are turned on in the inventive device. This avoids the momentary pulse of relatively high current which otherwise would regularly occur when CMOS devices are operated at higher supply voltages so that both transistors are momentarily on when switching logic states.

Referring now to FIGS. 2a and 3, the third portions of light from splitter 20 are conveyed to optical sensors 38 via optical switch section 36 which, in turn, returns a plurality of return light signal via optical fiber 40 indicative of the operating status of sensors 38. If the optical connections to sensors 38 are intact, the light delivered from optical switch section 36 will be at the transmitted wavelength, e.g. 815 nm. However, in the event the optical connection to sensors 38 has been destroyed, such as by decoupling of one of lines 40 or displacement of one of sensors 38, the respective return light signal from the involved sensor will include ambient light at wavelengths other than the transmitted wavelength. The remote sensing device according to the present invention includes ambient light detecting means for identifying such a problem situation.

Referring specifically to FIG. 3, operation of the data detection section 42 will now be explained including discussion of ambient light detection. The return light signals from optical switch section 36 are delivered via optical fiber 40 to photodiodes 48 and 50. Although a plurality of such photodiodes are provided, for exemplary purposes only photodiode 48n and 50n are illustrated and discussed here. Photodiode 50n receives the return lights signal via bandpass filter 52n, which is designed so as to eliminate all light except that at the expected transmitted wavelength, e.g. 815 nm. Application of the reset signal to driver 56 causes capacitor 54n to be initially discharged, whereafter photodiode 50n causes charging up of capacitor 54n in accordance with light being received through filter 52n. If the corresponding optical sensor 38n (FIG. 2a) is set so as to transmit light, such as when detecting an "ON" position, charging of capacitor 54n will be relatively rapid; conversely, when sensor 38n is detecting an "OFF" position, little charge occurs on capacitor 54n since little light is being returned from that sensor. The level of charge on capacitor 54n is outputted as a data signal on conductive line 46n.

Ambient data detector photodiode 48n is also integrating and storing the return light signal provided thereto. That is, capacitor 60n coupled to this photodiode has initially been discharged by the reset signal applied to driver 62, whereafter light impacting on photodiode 48n causes charging of capacitor 60n and, hence, a signal output on conductive line 46n'. The operation is distinguished from that of photodiode 50n, however, in that filter 66n is a bandreject filter which only permits light at wavelengths other than the transmitted wave length to pass, i.e., ambient light. Thus, if the optical connecting and operation of sensor 38n is intact, no ambient light is being passed and capacitor 60n does not become charged. However, where ambient light has been introduced into the system, such light will be detected by photodiode 48n and capacitor 60n will become charged so as to output a high level signal on conductive line 46n'.

In addition to these operations, reference detector photodiode 68 will be causing a build-up of charge on capacitor 70 in accordance with light being received from the control module via light splitter 20. As explained below, capacitor 70 is initially discharged via operation of control signal generating circuit 90 and threshold timer 92. Specifically, the rate of charging of capacitor 70 is used as a reference against which the charging of capacitors 54 and 60 will be measured to determine, respectively, the status of sensors 38 and the presence of ambient light. The rate of charging capacitor 70 is thus adjusted via mechanical antennuating means 114, such as an aperture shutter or other covering, for photodiode 68 so that the charging rate is faster than that of capacitor 54 when sensor 38 is not transmitting light, but slower than that of capacitor 54 when sensor 38 is transmitting light. For example, antennuator 114 may be set to make the illumination impacting on photodiodes 68 approximately half of the illumination provided by an "on" sensor. The state of charging of capacitor 70 is conveyed to logic/control section 72 as a reference signal carried by conductive line 46r. The reference detector is thus used to ensure that no collection of data concerning the operating status of sensors 38 takes place unless sufficient light is present to ensure a reliable reading.

The data signals output on conductive lines 46 from data detection section 42 are applied to registers 76 and 78 of the logic/control section 72. In section 72, these data signals are selectively loaded into registers 76 and 78 and subsequently clocked out as serial data on line 82 under the control of the shift clock delivered by control signal generating circuit 90. Included with this outputted serial data on line 82 is information loaded into status register 80; such information may include preset bits (as shown by the various connections to ground and to B+), as well as the device clock, and information from a power supply sensing circuit 116. Details of these data bits will be provided hereinbelow.

Clock signal generator 84 develops the basic clocking signals used to control the collection of data by the device module. The relative timing of the critical signals is illustrated in the timing diagram of FIG. 7. Time $t_1$ indicates the beginning of a first data collection period, at which time a reset signal is applied from generating circuit 90 to drivers 62 and 56 so as to initially discharge capacitors 54 and 60, respectively. A similar reset signal is applied through threshold timer 92 so as to initially discharge capacitor 70 of the reference detector. Thereafter, capacitors 54, 60 and 70 begin to charge in accordance with the amount of light impacting on their respective photodiodes 50, 48 and 68.

Presuming sufficient light is available in the system for adequate data collection, reference detector photodiode 68 causes charging of capacitor 70 to a point sufficient so that the reference signal on conductive line 46r causes a load signal at variable time $t_2$, as shown in Cycle 1 of FIG. 7, which causes registers 76 and 80 to load their respective inputs presented in parallel on lines 46. The data signals presented to register 76 are interpreted as high or low logic levels depending upon whether respective sensors 38 are on or off. The preset bit information and the device clock are loaded into status register 80 at the same time.

Control signal generating circuit 90 subsequently outputs a load ambient signal at time $t_3$ (FIG. 7) if the load signal at variable time $t_2$ has occured, causing data signals from the ambient data detectors 48, 60 to be loaded into ambient register 78. If ambient light is present in any of sensors 38 or their respective optical connections, the corresponding photodiode 48 and capacitor 60 will output a data signal having a high logic level when loaded into register 78; otherwise, the signals loaded into register 78 will be at low logic levels. The delay in loading of register 78 relative to registers 76 and 80 is to provide as much time as possible for collection of information concerning ambient light.

Beginning at time $t_4$, control signal generating circuit 90 delivers pulses on the shift clock output, causing the information loaded into registers 80, 76 and 78 to be serially outputted on line 82 to NAND gate 88. This information is combined with the period clock and pulsed clock from clock signal generator 84 so as to form a DATA OUT signal provided to power-transmit section 28 via conductive line 74. The purpose of NAND gate 88 is to ensure that data is delivered only under the conditions that the period clock is still in its data collection mode, e.g., high. A pulsed clock from clock signal generator 84 is also provided so as to control the frequency rate at which the data is outputted. The specific rate of the pulsed clock is selected so as to minimize power consumption when transmitting the serial data back to the control module; in the presently preferred embodiment, the pulsed clock is selected to be at a higher frequency than that of the shift clock and device clock.

In the event sufficient light has not been delivered to the system so as to provide reliable data, threshold timer 92 times out before capacitor 70 of the reference detector is charged to a level corresponding to a logic one. Upon timing out of threshold timer 92, outputting of control signals from circuit 90 is inhibited so that no loading of data occurs until the subsequent cycle. This is shown in FIG. 7 wherein a reset pulse at time $t_l$ in Cycle 2 is generated, but no load or output pulses occur within that cycle due to timing out of threshold timer 92. Instead, such control signals and outputs occur within the following cycle, Cycle 3. In Cycle 3, however, no reset pulse is generated at time t1 since such a pulse would destroy the data being collected by the ambient data detector and switch data detector during the extended collection time.

The transmission of data on line 74 is accomplished by the transmit section 28 shown in FIG. 4a. When the data is high, transistor 93 is turned on and current starts to be drawn through the tapped inductor 32, this current increasing with time. When the transistor 93 is subsequently turned off, the collapsing field of the inductor 32 causes the stored energy to be dumped through photodiode 30 and the tapped ratio of the inductor causes the voltage to diode 30 to be higher momentarily than the supply voltage B+. This arrangement, which is sometimes referred to as a "flyback coil" circuit, allows the device module to operate normally at low supply voltages with the voltage across diode 30 being increased only when transmission of data from the module is necessary. With this method, the duration, voltage, current and energy of the pulse applied to diode 30 are determined by the amount of stored energy in coil 32, as well as the impedances of the coil and diode. By way of example and without limitation, a suitable inductor 32 has a value of 125 mH with a 10% tap ratio.

The second light signals transmitted by diode 30 may be at a wavelength different than the first light signals where a single fiber cable 16 is used for communication between the control and device modules. For example, where the first light signal generated by the control module is at 815 nm, the second light signal generated by diode 30 may be at 880 nm. A GaAlAs LED may be used for such purposes. Diodes suitable for this application are described in the publication by David R. Goff entitled "Bidirectional Communication Using a Single Gallium Arsenide Diode", appearing in "Proceedings of the Twenty-Seventh Midwest Symposium on Circuits and Systems" at pages 800–802 and distributed by Western Periodicals Co. The publication resulted from a presentation at the 27th Midwest Symposium on Circuits and Systems held June 1984 at West Virginia University in Morgantown, W. Va. Another source of information on such diodes is a book by Forest R. Mims III entitled "Light Emitting Diodes", published in 1973 by Howard W. Sams & Co. The Goff article and Mims book are expressly incorporated herein by reference.

Within the control module, the received first and second light signals are separated based on their relative wavelengths by wavelength division multiplexer 18. The separated second light signals impinge on photodiode 98 and are converted into corresponding pulses by preamplifier 100 and pulse shaper 102. The data signals on line 104 are received by microcontroller 108 which treats the data as a serial bit stream input. The microcontroller synchronizes the bit streams using the preset bit information provided from status register 80 and provides data as a parallel logic output 110. If information concerning ambient light is being provided, such as by register 78, the microcontroller is programmed so as to verify that the ambient light data bit is "off" for each corresponding switch data bit from register 76.

Microcontroller 108 may also be used to examine other data bits indicating the overall performance of the device module and system. One such bit is the reference data bit which causes generation of the load signals in circuit 90. Another such bit is the voltage bit generated by sensing circuit 116 in the device module. These bits will now be discussed in detail.

The reference data bit may be used to control the power delivered to the device module by appropriate adjustment of power control 14 within the control module. The precise time of occurrence $t_2$ of the load signal is directly related to charging of capacitor 70 sufficiently high so that the reference signal on line 46 is recognized as a logic high level. In other words, the precise time of occurrence of $t_2$ will vary depending upon the charging rate of capacitor 70. As time $t_2$ varies, the relative time of loading of status register 80 will likewise vary and, hence, loading of the device clock into register 80 will be shifted slightly. In some instances, the load signal will occur so that the device clock is at a logic high level when loaded, while at other times the device clock will be loaded while at a logic low level. Thus, the device clock can effectively be viewed as a representation of the reference signal on line 46r. By controlling the light delivered by generating means 15, the logic level of the device clock as data is loaded into status register 80 ideally alternates between 0 and 1 on each successive transmission of data from the device module. This ensures enough light is being delivered from the control module to obtain accurate data collection, while keeping the overall level of delivered light in the system to an acceptable minimum. Using the minimum level of light necessary to reliably operate the device module serves to prolong the operating lifetime of the overall system since the photodiodes used in the device module may be subject to premature failure if constantly overlit.

Rather than relying on relative occurrence of transitions in the clock pulses as an indication of timing of the reference signal, the reference signal can instead be inputted directly back to the control module. This is shown in FIG. 3 by the dashed line labelled 107, which shows the reference bit being provided as another parallel input to status register 80 so that it ultimately will be output as serial data transmitted to the control module. As described above, the intensity of light generated in the control module can then be regulated so that the transmitted reference bit alternates between logic 0 and logic 1 on successive data transmissions.

In addition to using the aforedescribed information to control generating means 15, microcontroller 108 can provide information in data output 110 relating to the intensity of light being transmitted by the control module. Such information is useful in determining overall performance of the remote sensing system, particularly operation of main fiber optic cable 16. Specifically, the level of light intensity required at the device module is relatively constant for a particular installation; thus, changes in intensity may be responsive to changes in the ability of optical fiber 16 to carry light between the modules. Monitoring the level of light transmitted by the control module is therefore a way to monitor the quality and integrity of optical fiber 16 so that changes in transmitted levels can be used to signal the occurrences of a problem in the condition of main fiber cable 16. Such information is critical to reliability of the overall system, particularly where the main fiber cable is fairly long or is inaccessible to routine inspection.

Information concerning the level of transmitted light—whether to control generating means 15 or to monitor system operation or both—can also be obtained directly from preamplifier 100 by monitoring the level of the signals received by the preamplifier on photodiode 98. Thus, a connection 106 may be provided directly from the preamplifier to microcontroller 108 as shown in FIG. 1. The magnitude of the signal received by preamplifier 100 can be directly monitored via connection 106 so that microcontroller appropriately controls generating means 15 or outputs light intensity information with data output 110 or both.

The second bit of information which may be transmitted to the control module relates to power supply status circuit 116. This circuit, comprising a pair of diodes and a resistor, delivers a logic high level provided the supply voltage level at terminal B+ is at least 0.7 volts, or whatever voltage is sufficiently high to operate the electronic circuitry within the device module, plus a reasonable operating margin. If the voltage output by the power/transmit section 28 falls below this acceptable level, circuit 116 causes a change in the corresponding data bit being sent back to the control module. Accordingly, microcontroller 108 can effect an increase in the light being transmitted by generating means 15 so as to raise the B+ voltage delivered by power-transmit section 28. This information can also be delivered by microcontroller 108 in data output 110 in order to provide useful information concerning main cable 16 in the manner described immediately above.

Figure 2B:
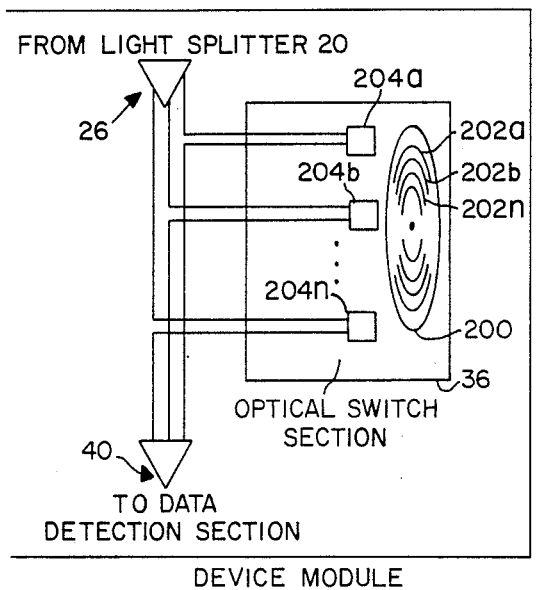
FIG. 2b is a schematic diagram of a second embodiment of the optical switch section of the device for FIG. 1.

A second embodiment of a remote sensing device according to the present invention is shown in FIG. 2b in which the device is used to sense the position of a multiposition control, which may be provided on the device module directly. In this arrangement, the device module is provided with a multiposition control, such as a rotary switch, depicted diagramatically and identified by reference character 200 in FIG. 2b, having a plurality of tracks 202 disposed therein. In lieu of the light sensors 38 of the above described embodiment, the third portions of the first light signal are instead delivered via optical fibers 26 to a plurality of light detectors 204 arranged so as to selectively transmit or block light according to the relative position of rotary control 200. That is, each light detector 204a, 204b, ... 204n is arranged to correspond with one of tracks 202a, 202b, ... 202n so that data concerning whether each sensor 204 is blocked or not is presented to data detection section 42 via optical fibers 40. This data is transmitted to the control module in the same manner as described above.

Various arrangements for implementing this embodiment are possible without departing from the spirit or scope of the present invention. For example, fibers 26 and 40 may be disposed in direct alignment on opposite sides of control 200 with tracks 202 comprising predetermined openings or slots in control 200. As the control is rotated, light is selectively blocked or transmitted from fibers 26 to respective ones of fibers 40 to provide return light signals. In this configuration, detectors 204 would comprise the aligned ends of the corresponding cable pairs 26a and 40a, 26b and 40b, ... 26n and 40n. Alternately, fibers 26 and 40 may be disposed adjacent each other on the same side of control 200 with tracks 202 selectively providing for reflection of light from fibers 26 to fibers 40. Again, detectors 204 would comprise the ends of fibers 26 and 40 aligned in this manner.

Other possible arrangements for control 200, tracks 202 and detectors 204 are possible, however, according to the present invention. Rather than a rotary control, for example, a linear track or linear position encoder may be employed wherein one of a plurality of possible settings can be selected by movement of a switch or other device in a non-rotary fashion. In this case, detectors 204 may comprise optical sensors of the type described above, i.e., binary optical sensors 38. The collective information from these sensors can be decoded by microcontroller 108 so as to determine the specific setting of the linear control.

It is noted that in the embodiment represented in FIG. 2b, the optical sensors 204 may be contained entirely within the device module. Thus, the device module can be sealed so as to ensure total protection for the light sensors 204 against ambient light. In such a case, the need for ambient register 78 is eliminated. This register can instead be used to collect additional data signals from other optical sensors 204, either in the form of additional tracks 202 on control 200 or from a second multiposition control (not shown) provided on the device module. In this case, the signals labeled "load signal" and "load ambient" (FIGS. 3 and 7) can be generated simultaneously since the need for delaying the latter so as to collect more information on ambient light is eliminated. Applying an input to the line labeled "Encoder" of logic/control section 72 (FIG. 3) causes the signal load and ambient load outputs to be tied together in this fashion. The Encoder input to control signal generating circuit 90 may, for example, be tied to ground (logic 0) when a multiposition control is being used in this manner; otherwise, this input may be tied to the B+ terminal (logic 1) or left floating.

Figure 4B:
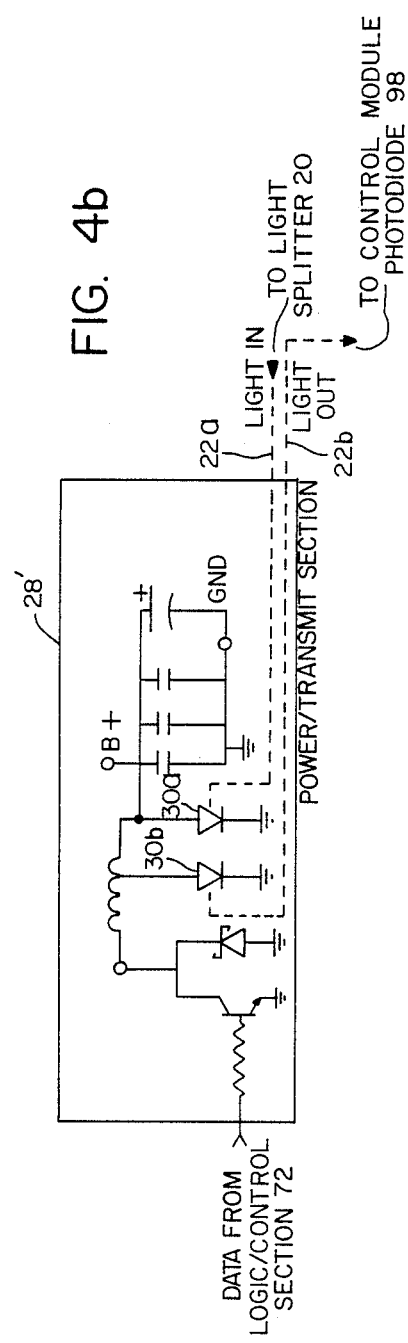
FIG. 4b is a schematic circuit diagram of a second embodiment of the power-transmit section of the remote sensing device.

Another embodiment of a remote sensing device according to the present invention is shown in FIG. 4b with respect to a modification in power/transmit section 28'. According to this embodiment, main fiber cable 16 connecting the control module to the device module is replaced with a pair of fiber optic cables, each dedicated exclusively to carrying the first and second light signals, respectively. This eliminates the need for wavelength division multiplexer 18 within the control module since no multiplexing onto a single optical cable 16 is required.

As shown in FIG. 4b, a first photodiode 30a is coupled to an optical fiber 22a to receive the first portion of light from light splitter 20. In the manner described above with respect to FIG. 4a, this provides a low supply voltage B+ to the device module. A second photodiode 30b is coupled to another optical fiber 22b which is connected directly to photodiode 98 within the control module. Thus, the functions of transmitting a first light signal for supply purposes and a second light signal for data purposes have been effectively separated through the use of two such photodiodes 30a, 30b.

Other embodiments of power-transmit section 28 are possible without departing from the spirit or scope of the present invention. For example, voltage bias for the flyback transformer could be optained from a reliable source of incident external light. Alternately, the bias on the flyback transformer could be eliminated altogether. Another possibility is to eliminate the flyback transformer in favor of a biased diode and capacitive coupling. In this latter arrangement, the data pulses outputted from logic/control section 72 are added through the capacitive coupling to the bias, thereby achieving the higher voltage (above the power supply voltage) that is needed to ensure transmission of a light signal.

Figure 5:
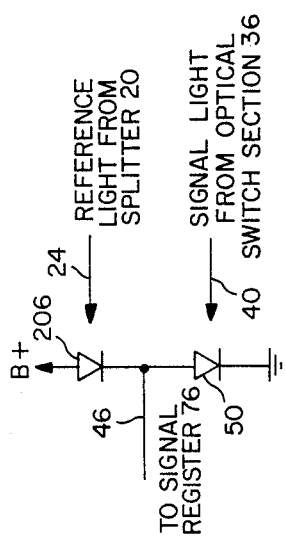
FIG. 5 is a schematic circuit diagram of another embodiment of the photodiodes of the data detecting system of FIG. 3.

A further embodiment of a remote sensing device according to the present invention can be appreciated by reference to FIGS. 3 and 5. In this embodiment, the reference detector comprising photodiodes 68, capacitor 70 and threshold timer 92 is eliminated. Instead, a plurality of reference photodiodes 206 is connected individually in series with a respective one of each of switch data detector photodiodes 50. An exemplary arrangement of such a connection is shown in FIG. 5, it being understood that this structure is repeated for each of the other optical fibers 40a, 40b, . . . 40n from sensors 38a, 38b, . . . 38n. Reference photodiode 206 receives the second portion of light from light splitter 20 via optical fiber 24, as described above, while photodiode 50 receives the return light signals provided by optical switch section 36, also as described previously. The junction of photodiodes 50 and 206 is delivered as a data output signal to registers 76 of logic/control section 72.

In operation, light received from each sensor 38 is compared with light derived from the main fiber cable 16. If the illumination on the two diodes is exactly equal, the data signal output at the junction on line 46 will be held at the midpoint, i.e., one-half, of the power supply voltage B+. Any imbalance in illumination will cause the voltage on line 46 to swing toward either ground or to the supply voltage. Thus, the light impacting on photodiode 206 is selectively controlled so as to provide a threshold comparison from which the status of switches 38 can be derived. This is accomplished by various means, such as a diaphragm or aperture (not shown) interposed between optical coupler 24 and photodiode 206. The nonlinearity of the voltage-current curves associated with the diodes will cause the voltage swing on conductive line 46 to be more than linear with changes in light level. Thus the change in return light level from optical switch section 36 will move the junction voltage on line 46 well into the logic 0 or logic 1 region, accomplishing the desired function.

A series-connected pair of photodiodes as shown in FIG. 5 is provided for each of sensors 38. For convenience, all of the reference photodiodes 206 may be grouped in a single location within the device module so that a single fiber from light splitter 20 may be used to convey light to the reference photodiodes. In such a case, only one aperture or diaphragm may also be needed for purposes of controlling the amount of light delivered to the reference photodiodes.

According to this further embodiment, data collection will occur with each new pulse of the period clock (FIG. 7). Thus, each cycle of operation will include pulses of the nature shown in Cycle 1 of FIG. 7; there is no provision in this instance for delaying the collection of data where insufficient light was present. However, the degree of light conveyed to the device module can still be monitored in a manner by use of power supply monitor circuit 116 (FIG. 3).

Figure 6A:
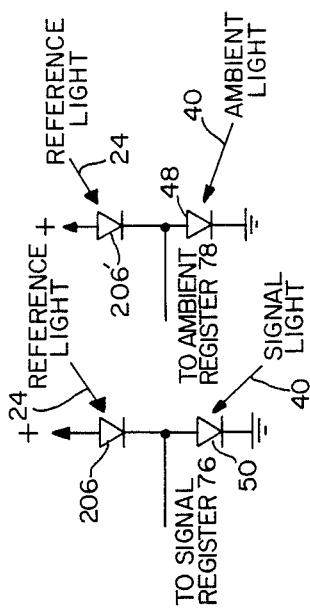
FIG. 6a is a circuit diagram illustrating a photodiode arrangement in the data detection section of FIG. 3 for detecting ambient light.
Figure 6C:
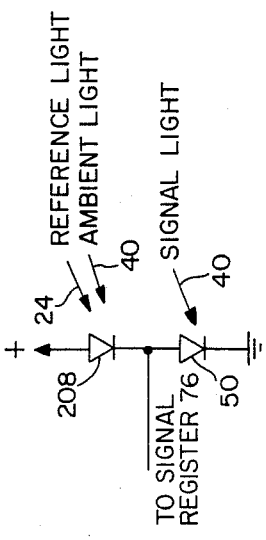
FIG. 6c is a schematic circuit diagram showing a third embodiment of a photodiode arrangement for the data detection section of FIG. 3.
Figure 6B:
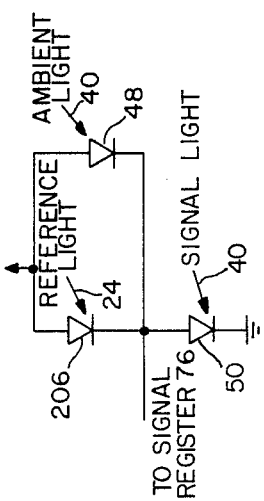
FIG. 6b is a schematic circuit diagram of a second embodiment of a photodiode arrangement for detecting ambient light in the data detection section of FIG. 3.

In this further embodiment, modification of the ambient data detector (photodiodes 48, capacitors 60, register 78, etc.) must also be modified since no reference signal is being provided due to elimination of reference detector photodiode 68. Thus, the data lines 46 coupled to register 78 can be used to collect information from a further set of optical sensors 38, if desired. Alternately, arrangements for obtaining information on ambient light can be employed as shown in FIGS. 6a-c. Each of these embodiments will now be described.

In FIG. 6a, the series coupled pair of photodiodes 50, 206 shown in FIG. 5 is repeated, along with a second series-connected pair of photodiodes 206', 48. Photodiode 48 receives ambient light from optical fiber 40 in the manner described previously, while photodiode 206' receives the reference light, i.e. the second portion of the first light signal, provided from light splitter 20 via optical fiber 24. Thus, photodiodes 206 and 206' may receive the same reference light. The junction of photodiodes 206' and 48 is coupled to the parallel input of ambient register 78 (FIG. 3) and data is collected on ambient light by using the same illumination balancing method discussed above. If the signals/reference pair of photodiodes 50, 206 indicates "on" while the ambient- /reference pair of photodiodes 48, 206' indicates "off", then a true signal is indicated.

In a modification of this arrangement, FIG. 6b shows placement of the ambient light photo detector 48 in parallel with the reference photodiode 206, both being in series with signal photodiode 50. In this case, an "on" will only be indicated if the signal light intensity impinging on photodiode 50 is stronger than both the reference and ambient light intensities.

FIG. 6c shows a further modification using only a pair of photo detectors 50, 208 for each of optical sensors 38. In this case, photodiode 208 receives both the reference light from splitter 20 via optical fiber 24, as well as the ambient light from optical switch section 36 via optical fiber 40. The amount of light impinging on photodiode 208 is adjusted via a diaphragm or other means (not shown) such that the presence of ambient light prevents the output at the junction of the photodiodes from ever going high.

In the embodiments shown in FIGS. 6b and 6c, there is no need for providing an ambient register 78 separate from the signal register 76. Thus, register 78 can instead be used to collect data from an additional set of optical sensors 38. Alternately, a multiposition control or sensor, such as that shown in FIG. 2b, can be employed in place of optical sensors 38.

Figures 1, 8:
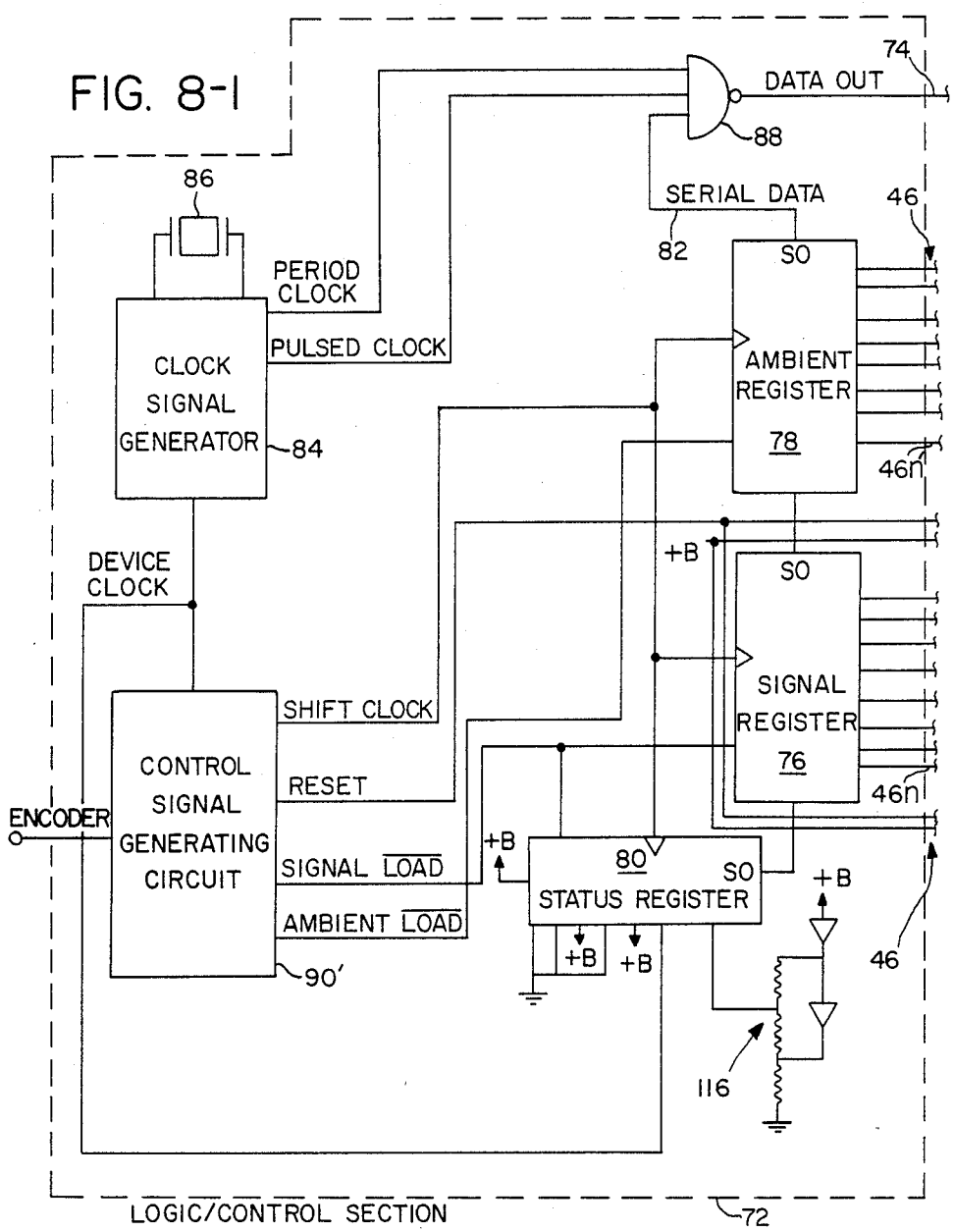
FIG. 8 is a schematic diagram illustrating a second embodiment of the data detection and logic/control section of the remote sensing system according to the present invention.
Figures 2, 8:
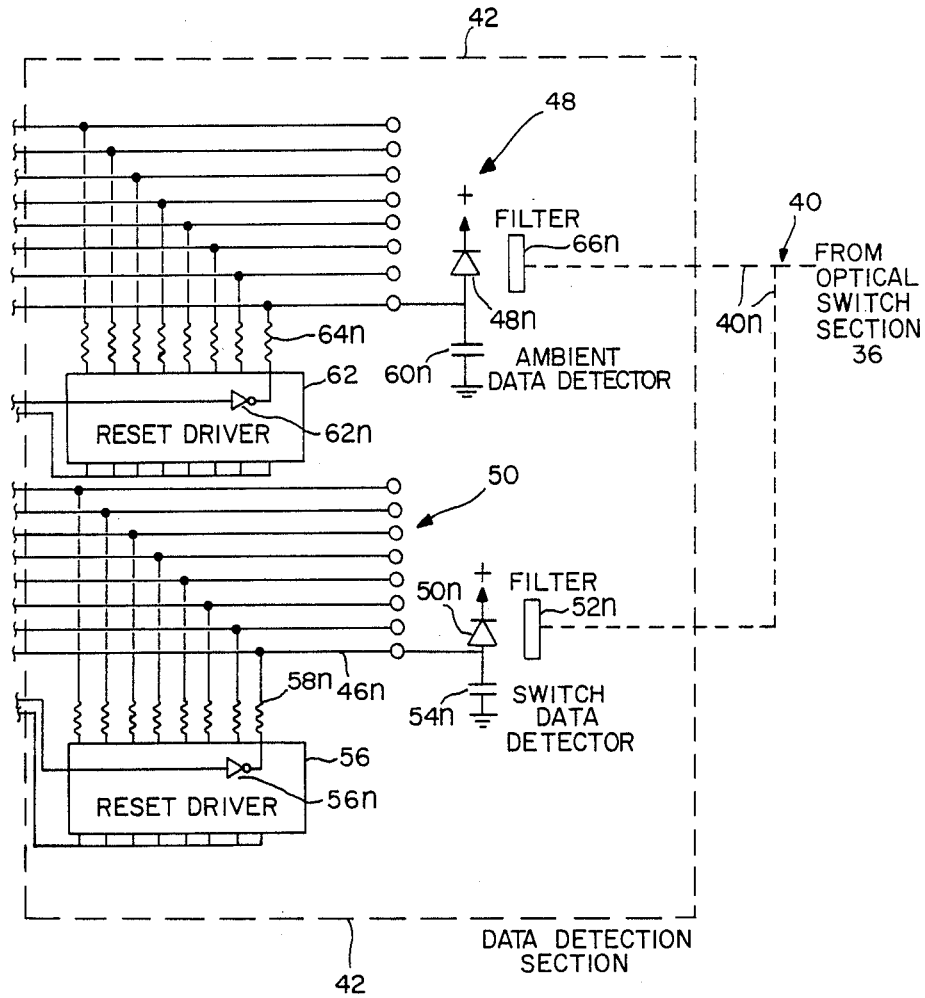

Another embodiment of the remote sensing system according to the present invention is illustrated in FIG. 8, which shows a modified version of the data detection section and logic/control section of the system. In the embodiment shown in FIG. 8, the elements responsible for generating a reference signal have been eliminated, i.e., photodiode 68, capacitor 70, conductive line 46r and threshold timer 92. In addition, a modified control signal generating circuit 90' is employed. In all other respects, however, the embodiment illustrated in FIG. 8 is identical to that shown in FIG. 3 and discussed above. Accordingly, the following discussion focuses only on the aforementioned differences.

In eliminating the reference signal generating elements, the embodiment shown in FIG. 8 does not rely upon the presence of the reference signal reaching a predetermined level in order to load parallel data into registers 76, 78 and 80 and output serial data on conductive line 74. Instead, loading and outputting of data regularly occurs with each cycle of the period clock. That is, control signal generating circuit 90' outputs the various signals illustrated in the Cycle 1 portion of the timing diagram of FIG. 7 for each cycle of the period clock. Data is routinely taken by the device module and transmitted to the control module for each cycle of the period clock.

Since the reference signal elements and threshold timer have been eliminated, registers 76, 78 and 80 are effectively acting as threshold detectors in that each ascertains whether the signals being presented at their parallel inputs will be interpreted as a logic 0 or a logic 1. The collection of data by logic/control section 72 must therefore be at a speed sufficient to permit capacitors 54 and 60 to charge up high enough under the appropriate conditions. For example, capacitor 54n must have time to charge so as to create a logic 1 in register 76 when optical sensor 38n (FIG. 2a) indicates an "on" condition. Likewise, capacitor 60n must have time to charge so as to create a logic 1 in register 78 when ambient light is present in the return light carried on fiber 40n. Accordingly, the rate of period clock can be adjusted to ensure adequate time for data collection to occur within each cycle. Notably, the availability of adequate light intensity is provided through operation of circuit 116 and/or signal level line 106 (FIG. 1) even in this embodiment.

From the foregoing, it can be appreciated that the present invention provides a remote sensing device for use with optical switches or other detectors wherein a plurality of such optical sensors can be connected to a single device module which is, in turn, connected to a remote control module. A single fiber optic cable can be used to interconnect the control and device modules, with light signals being passed therebetween to provide all of the power needed by the device module as well as to communicate back to the control module. Alternately, separate fiber optic cables can be employed for these purposes.

Within the device module, all of the circuitry operates at very low voltage levels, with voltage step-up being required only for purposes of transmitting data back to the control module. Further, the device module includes means for monitoring for the presence of ambient light in the information obtained from the optical switches, thus preventing the taking of incorrect data. By controlling the amount of light delivered from the control module, means are also provided for ensuring that only accurate data is collected, i.e. that adequate but not excessive light intensities are being used in the system.

Other embodiments of the invention will be apparent to those skilled in the art from consideration of the specification and practice of the invention disclosed herein. The present invention also has more general application in connection with remote sensing systems comprising a control module that is coupled to a remote device module via optical fibers, wherein power for the device module is derived entirely from the light being transmitted from the control module via the optical fiber.

For example, the present invention may find use in detecting physical parameters to which the device module or components thereof are exposed, e.g., changes in temperature and/or pressure. This can be readily accomplished by providing a crystal oscillator (as exemplified by components 84 and 86 in FIGS. 3 and 8) which is sensitive to changes in such physical parameters. As these parameters change, the time of occurrence of transitions on the Device Clock line is shifted in accordance with known techniques, and this is detected by the control module inasmuch as the Device Clock is included in the data signals delivered thereto via status register 80. In such an embodiment, optical encoding information such as depicted in FIGS. 3 and 8 can be left intact so as to operate concurrently with the physical parameter detection circuitry. Alternately, data detection section 42 can be eliminated thereby rendered the device module of simple construction.

The present invention can also be used with binary sensors that are not optical in nature, e.g., switch sensors that electrically determine the operating status of the associated switch. Referring to FIG. 3, by way of example, this can be accomplished by providing a single-pole single-throw switch having one pole coupled to conductive lines 46 (the parallel inputs to registers 76, 78) and the other pole coupled to ground. Due to the pull-up action provided by reset drivers 56, 62, conductive lines 46 are generally maintained at a high logic level until their respective binary switch sensor is grounded, thereby pulling-down the conductive line. In this fashion, parallel information concerning the status of the switches can still be obtained yet without concerns of ambient light or any of the other problems associated with optical switches.

In the latter embodiment explained immediately above, a possible use for such a remote device module is in connection with keyboards, such as in a communications terminal. Of course, such an arrangement can also be used to monitor the operating status of switches such as those installed in an assembly line so as to facilitate automated manufacturing within the line.

The present invention should therefore be understood on a larger scale to relate to optical systems generally in which a control module is used to communicate with a remote device module via an optical connection. The specific circuitry which comprises the remote device module is subject to modification depending upon the particular application to which the system is adapted. However, a common thread to all such modules is the use of low voltage and consequently low power within the device module—that developed from the voltage associated with a single photodiode—except for the transmission of data to the control module. Voltage multiplication arrangements are employed only within the power transmit section of the device module in order to produce the voltage pulses necessary to ensure communication via optical signals with the control module.

The present invention further relates, on a basic level, to such remote sensing systems in which means are provided to monitor the performance of the system. Monitoring occurs on several levels, i.e., monitoring for the occurence of ambient light within one of the optical sensors, as well as monitor to check the integrity of the optical interconnection between the control and device modules.

Thus, it is intended that the specification and drawings be considered as exemplary only, with a true scope and spirit of the invention being indicated by the following claims.

What is claimed is:

1. A low-power device for converting a voltage signal into optical data, comprising:
   a light emitting diode having a predetermined forward current condition threshold;
   power supply means coupled to said diode for maintaining a voltage bias across said diode at a level below said forward current conduction threshold;
   circuit means receiving said voltage signal and being coupled to said diode and to said power supply means for delivering voltage pulses to said diode in accordance with said voltage signal, said voltage pulses, when combined with said bias voltage, having a level greater than said forward conduction threshold for causing said diode to emit optical data corresponding to the voltage signal;
   means for generating a first light signal; and
   means for optically coupling said first light signal to said diode so as to produce said voltage bias.

2. A device as recited in claim 1, wherein said coupling means carries both said first light signal and said optical data.

3. A device as recited in claim 2, wherein said coupling means comprises an optical fiber.

4. A device as recited in claim 2, further including means connected to said coupling means for receiving said optical data, said generating means being coupled to said receiving means for adjusting the intensity of said first light signal in response to said optical data.

5. A device as recited in claim 4, wherein said generating means and said receiving means are disposed in a control module, and said light emitting diode, said power supply means and said circuit means are disposed in a device module remote from said control module.

6. A low-power device for converting a voltage signal into optical data, comprising:
   a light emitting diode having a predetermined forward current conduction threshold;
   power supply means coupled to said diode for maintaining a voltage bias across said diode at a level below said forward current conduction threshold;
   circuit means receiving said voltage signal and being coupled to said diode and to said power supply means for delivering voltage pulses to said diode in accordance with said voltage signal, said voltage pulses, when combined with said bias voltage, having a level greater than said forward conduction threshold for causing said diode to emit optical data corresponding to the voltage signal;
   means for generating a first light signal;
   a photodiode coupled to said power supply means; and
   first means for optically coupling said first light signal to said photodiode so as to produce said voltage bias.

7. A device as recited in claim 6, further including means for receiving said optical data and second means for optically coupling said optical data to said receiving means.

8. A device as recited in claim 7, wherein said first and second coupling means each comprises an optical fiber.

9. A device as recited in claim 7, wherein said generating means is coupled to said receiving means for adjusting the intensity of said first light signal in response to said optical data.

10. A device as recited in claim 7, wherein said generating means and said receiving means are disposed in a control module, and said light emitting diode, said power supply means, said photodiode and said circuit means are disposed in a device module remote from said control module.

* * * * *